United States Patent
Tercero Vargas et al.

(10) Patent No.: US 10,123,251 B2
(45) Date of Patent: Nov. 6, 2018

(54) INTERNETWORKING BETWEEN RADIO RESOURCE MANAGEMENT AND SPECTRUM CONTROLLER

(71) Applicant: Telefonaktiebolaget LM Ericsson (publ), Stockholm (SE)

(72) Inventors: Miurel Isabel Tercero Vargas, Sollentuna (SE); Johan Axnäs, Solna (SE); Kumar Balachandran, Pleasanton, CA (US); Tim Irnich, Neuss (DE); Jonas Kronander, Knivsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 58 days.

(21) Appl. No.: 15/112,071

(22) PCT Filed: Jan. 20, 2014

(86) PCT No.: PCT/SE2014/050061
§ 371 (c)(1),
(2) Date: Jul. 15, 2016

(87) PCT Pub. No.: WO2015/108459
PCT Pub. Date: Jul. 23, 2015

(65) Prior Publication Data
US 2016/0337938 A1    Nov. 17, 2016

(51) Int. Cl.
*H04W 40/30* (2009.01)
*H04W 40/12* (2009.01)
(Continued)

(52) U.S. Cl.
CPC ........... *H04W 40/30* (2013.01); *H04W 24/02* (2013.01); *H04W 28/18* (2013.01); *H04W 40/12* (2013.01); *H04W 40/16* (2013.01)

(58) Field of Classification Search
CPC ..... H04W 40/30; H04W 24/02; H04W 28/18; H04W 40/12; H04W 40/16
(Continued)

(56) References Cited

U.S. PATENT DOCUMENTS

2007/0248061 A1* 10/2007 Poston ................. H04W 72/02
370/338
2010/0304678 A1* 12/2010 Chandra ............... H04W 16/14
455/62
(Continued)

FOREIGN PATENT DOCUMENTS

EP         2871878 A1    5/2015
WO    2008097221 A1    8/2008
(Continued)

*Primary Examiner* — Obaidul Huq
(74) *Attorney, Agent, or Firm* — Murphy, Bilak & Homiller, PLLC

(57) ABSTRACT

Methods, apparatuses, and computer program products for communicating channel assessment, channel information, and routing information between a spectrum controller and radio resource manager. A spectrum controller obtains channel information and classifies a number of radio channels of a network as available, partially available, or unavailable. The availability information is sent to a radio resource manager, which can use the information to determine a routing solution. The radio resource manager can request that the spectrum controller perform an access negotiation for a partially available channel. Based on the result of the negotiation, the radio resource manager may re-route information in the network.

38 Claims, 11 Drawing Sheets

(51) Int. Cl.
*H04W 24/02* (2009.01)
*H04W 28/18* (2009.01)
*H04W 40/16* (2009.01)

(58) Field of Classification Search
USPC .................................................. 370/310, 328
See application file for complete search history.

(56) References Cited

U.S. PATENT DOCUMENTS

| | | |
|---|---|---|
| 2011/0143761 A1 | 6/2011 | Uusitalo et al. |
| 2012/0094681 A1 | 4/2012 | Freda et al. |
| 2013/0121178 A1 | 5/2013 | Mainaud et al. |
| 2013/0121337 A1 | 5/2013 | Nguyen et al. |
| 2013/0143613 A1* | 6/2013 | Lee ........................ H04W 48/08 455/509 |
| 2013/0295948 A1 | 11/2013 | Ye et al. |
| 2014/0301237 A1 | 10/2014 | Yi et al. |
| 2015/0017999 A1* | 1/2015 | Chen ...................... H04W 16/14 455/452.1 |
| 2015/0289250 A1* | 10/2015 | Ishizu .................... H04W 16/14 455/452.1 |

FOREIGN PATENT DOCUMENTS

| | | |
|---|---|---|
| WO | 2013069978 A1 | 5/2013 |
| WO | 2014006664 A1 | 1/2014 |

\* cited by examiner

INTERNETWORKING BETWEEN RADIO RESOURCE MANAGEMENT AND SPECTRUM CONTROLLER

TECHNICAL FIELD

This disclosure relates generally to radio access networks and, more particularly, to channel assessment, channel negotiation, and routing information through radio access network nodes.

BACKGROUND

Dense deployments of base stations and wireless access nodes are being used to cope with the significant growth in wireless data traffic. One implementation is the ultra-dense network (UDN), where wireless nodes within the network are abundantly deployed. In these networks, multiple routes between pairs of nodes can be established, and thus, routing functionality may be needed to assign routes and establish the network topology.

Often, various network and devices will be required to share the available wireless spectrum. For instance, many wireless networks operate in unlicensed bands, where certain regulatory limitations on bandwidth, power spectral density and deployment characteristics are used to enable sharing. An example of such operation is Wi-Fi or Bluetooth, where spectrum sharing occurs without active regulatory control. Wi-Fi systems share spectrum using interference avoidance by channel selection and collision avoidance. However, disparate systems do interfere with each other and can suffer degraded performance. Slightly more sophisticated spectrum sharing can be done on a binary basis in TV White Space (TVWS) systems, or in systems that use Licensed Shared Access for binary sharing of spectrum between a wireless operator and a primary user.

SUMMARY

Although spectrum sharing is often required, existing technologies do not provide for active spectrum management and an internal assessment of performance of available spectrum resources. What is needed is active and dynamic assessment of the quality and availability of spectrum resources and the ability to negotiate access to those resources to improve routing solutions, particularly in dense radio network deployments.

According to some embodiments, methods, apparatuses, and computer program products are provided for communicating channel assessment, channel information, and routing information between a spectrum controller and radio resource manager.

In some embodiments, a method for routing information in a network having a plurality of radio network nodes, a plurality of radio channels, a spectrum controller, and a radio resource manager is provided. The method includes obtaining, at the spectrum controller from a channel information source, channel information associated with one or more of the plurality of channels. The method also includes assigning an availability tag to one or more of the plurality of channels based on the obtained channel information, wherein each of the assigned availability tags classifies a respective channel as available, partially available, or unavailable. The spectrum controller may then generate a channel list indicating the availability of one or more of the plurality of channels based on the assigned availability tags and send the channel list to the radio resource manager for use in routing information in the network.

In some embodiments, a spectrum controller having a processor and a memory is provided. The memory contains instructions, executable by the processor, whereby the spectrum controller is operable to obtain, from a channel information source, channel information associated with one or more of a plurality of channels in a network. The spectrum controller is also operable to assign an availability tag to one or more of the plurality of channels based on the obtained channel information, wherein each of the assigned availability tags classifies a respective channel as available, partially available, or unavailable. The spectrum controller may then generate a channel list indicating the availability of one or more of the plurality of channels based on the assigned availability tags and send the channel list to the radio resource manager for use in routing information in the network.

In some embodiments, a method for routing information in a network having a plurality of radio network nodes and a plurality of radio channels is provided. The method includes receiving a channel list from a spectrum controller at a radio resource manager. The channel list indicates whether each of the plurality of channels is available, partially available, or unavailable. The method also includes determining a plurality of candidate routes between two or more network nodes based on the channel list, wherein the plurality of candidate routes is limited to channels from the channel list that are indicated as available and/or partially available. The method also includes selecting a routing solution based on the plurality of candidate routes. The method may also include sending, from the radio resource manager to the spectrum controller, a request for access negotiation if the routing solution is based at least in part on a channel indicated as partially available.

In some embodiments, a radio resource manager having a processor and memory is provided. The memory contains instructions, executable by the processor, whereby the radio resource manager is operable to receive a channel list from a spectrum controller, which indicates whether a plurality of channels is available, partially available, or unavailable. The radio resource manager is also operable to determine a plurality of candidate routes between two or more network nodes based on the channel list, wherein the plurality of candidate routes is limited to channels from the channel list that are indicated as available and/or partially available. The radio resource manager is also operable to select a routing solution based on the plurality of candidate routes. The radio resource manager may also send, to the spectrum controller, a request for access negotiation if the routing solution is based at least in part on a channel indicated as partially available.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Particular embodiments are directed to methods, devices, and computer program products for improved information routing in a radio network.

Figure 1:
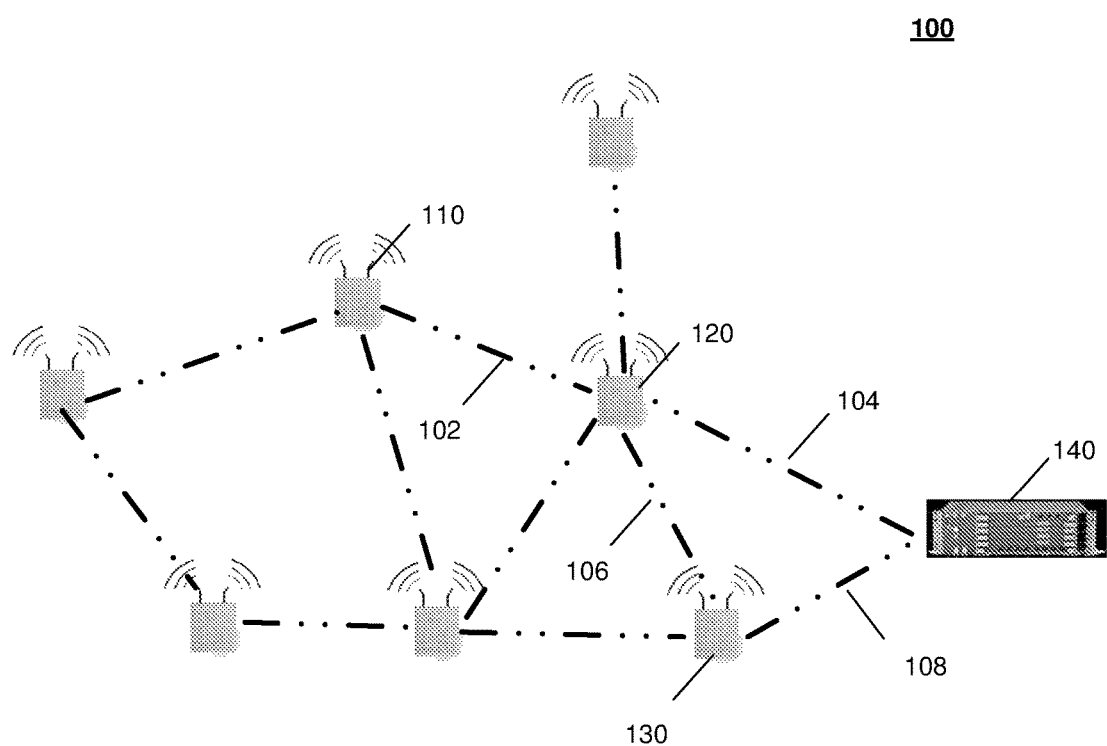
FIG. 1 is an illustration of an exemplary wireless radio network in accordance with exemplary embodiments.

Radio networks may be constructed with communicating nodes that need to choose (or have chosen for them) a channel or physical radio resource to communicate with each other. For example, a network, such as network 100 of FIG. 1, could be constructed of multiple connected nodes, such as nodes 110, 120, 130, and 140, wherein information is carried along certain routes in the network. These routes (or "hops") may be comprised of, for instance, paths 102, 104, 106, and/or 108 as shown in the example of FIG. 1. Typically, information will flow in the network 100 to or from an aggregation point, which is illustrated as node 140 in this example. Aggregation node 140 may be connected, for instance, to the mobile core network, towards a wireless device, towards one or more control units.

Frequently, the radio spectrum associated with such networks and communications is shared with other networks and devices. Thus, the desired radio spectrum for communications in the network may often only be available under rules that do not guarantee predictable interference levels or availability. Control over the spectrum can be implemented in the network (or implemented as a cloud service somewhere in a cloud), for instance, using a spectrum controller, which monitors the performance of resources assigned to various parts of the network. The spectrum controller could also, for example, negotiate with an external entity, such as another network operator or spectrum broker in order to obtain the availability of a channel. As is clear from the illustration of FIG. 1, there may be multiple routes between given node-pairs of network 100. Thus, routing decisions are required when communicating information to optimize performance. The availability information from a spectrum controller can be useful when determining how to best share a given channel.

Aspects of the present disclosure may be applied to any cluster of wirelessly connected nodes. For example, disclosed techniques may be applied when the implementation of the network is an ultra-dense network (UDN) configuration, where the wireless nodes in the network are abundantly deployed and can establish multiple routes between pairs of nodes. This may be accomplished, for instance, by means of a routing function. The routing function may be part of a radio resource manager. This routing function is the function that assigns routes, and thus establishes network topology. It may also allocate radio resources for established links between two neighboring wireless nodes. The overall radio resource manager functionality is thus able to identify the importance of a channel for the routing solution. The present disclosure provides for communications between the radio resource manager and the spectrum controller so that they may cooperatively improve radio transmission in the network. For example, while the radio resource manager may be able to identify important or desirable channels, the spectrum controller has information regarding channel availability and quality. Effective communication of the availability information from the spectrum controller to the radio resource manager enables improved route selection.

Figure 2:
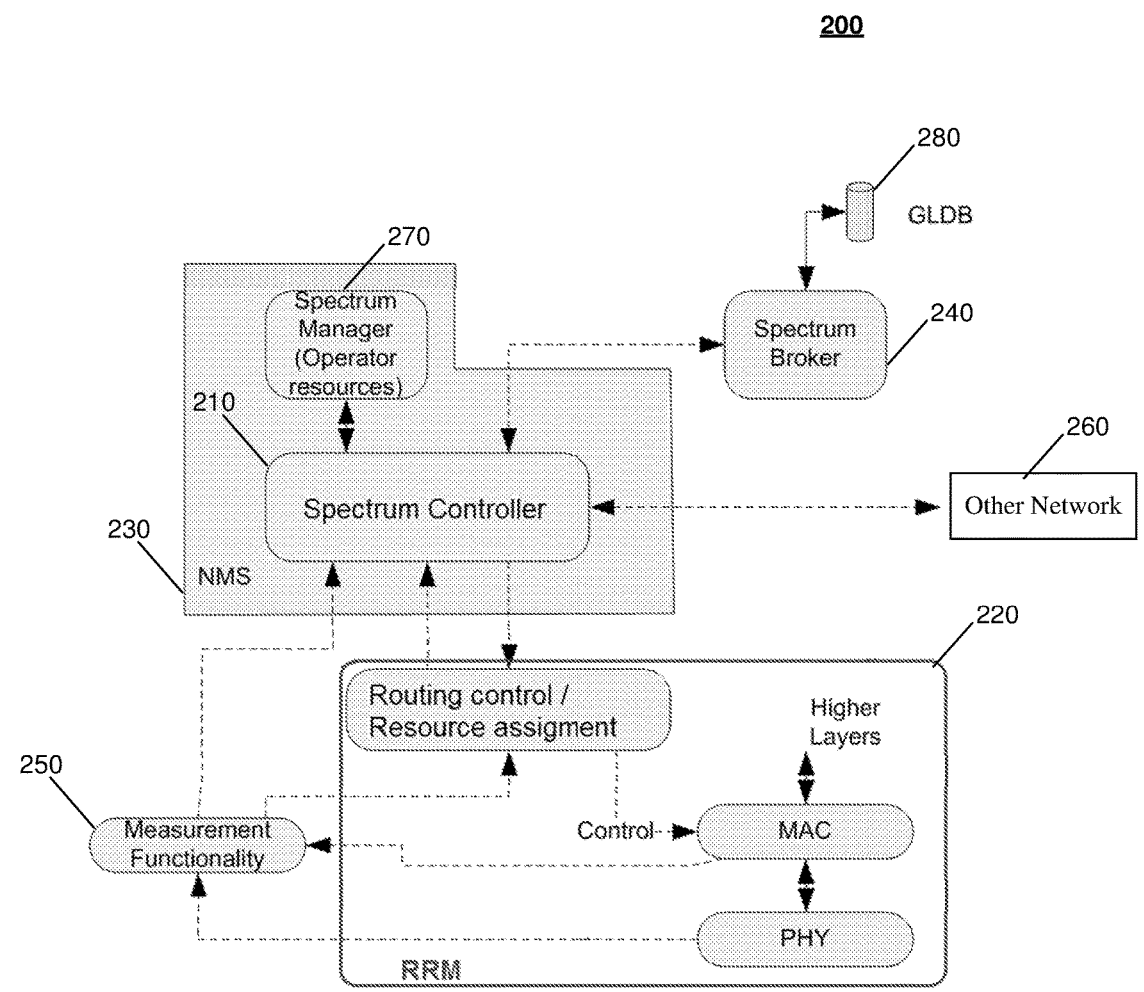
FIG. 2 is a block diagram of network components in accordance with exemplary embodiments.

Referring now to FIG. 2, a block diagram 200 of a spectrum controller 210 in communication with a radio resource manager 220 is provided. These components may be used to effectively manage information routing in a network, such as network 100.

As is shown in FIG. 2, the spectrum controller 210 may be part of a larger network management system (NMS) 230. This system 230 may also include a spectrum manager 270 of the operator. The spectrum controller 210 may be in communication with the spectrum manager 270, as well as spectrum allocation entities such as spectrum broker 240 and geo-location database 280. In some embodiments, these allocation entities are external entities; however, they may also be internal to the network. The spectrum controller 210 may also be connected to another network 260, including an inter-network coordination manager. The spectrum controller may also be connected to one or more measurement functionalities 250.

Each of these components can be used to provide information to the spectrum controller to help it determine channel characteristics in the network 100, including channel availability. The channel availability can then be communicated to radio resource manager 220, which is connected to the spectrum controller 210. The functionality of the radio resource manager 220 may include routing control and resource assignment, as well as control over the MAC and PHY layers of the network. In some embodiments, the measurement functionality may be tied to the radio resource manager 220, for instance, by obtaining channel information from the PHY layer of the network.

One of ordinary skill in the art will recognize that the spectrum controller 210 and radio resource manager 220 of FIG. 2 may be physically embodied in numerous ways. For instance, spectrum controller 210 and radio resource manager 220 may be separate logical units of a single device, such as a network node (e.g., 110,140) or a dedicated spectrum controlling device. Alternatively, spectrum controller 210 and radio resource manager 220 may be separate devices, or form logical components of separate devices. Further, the functionality of spectrum controller 210 and radio resource manager 220 may be distributed across one or more devices. For example, the routing functionality of radio resource manager 220 may be distributed across one or more nodes (e.g., 110,140) of network 100.

Figure 3:
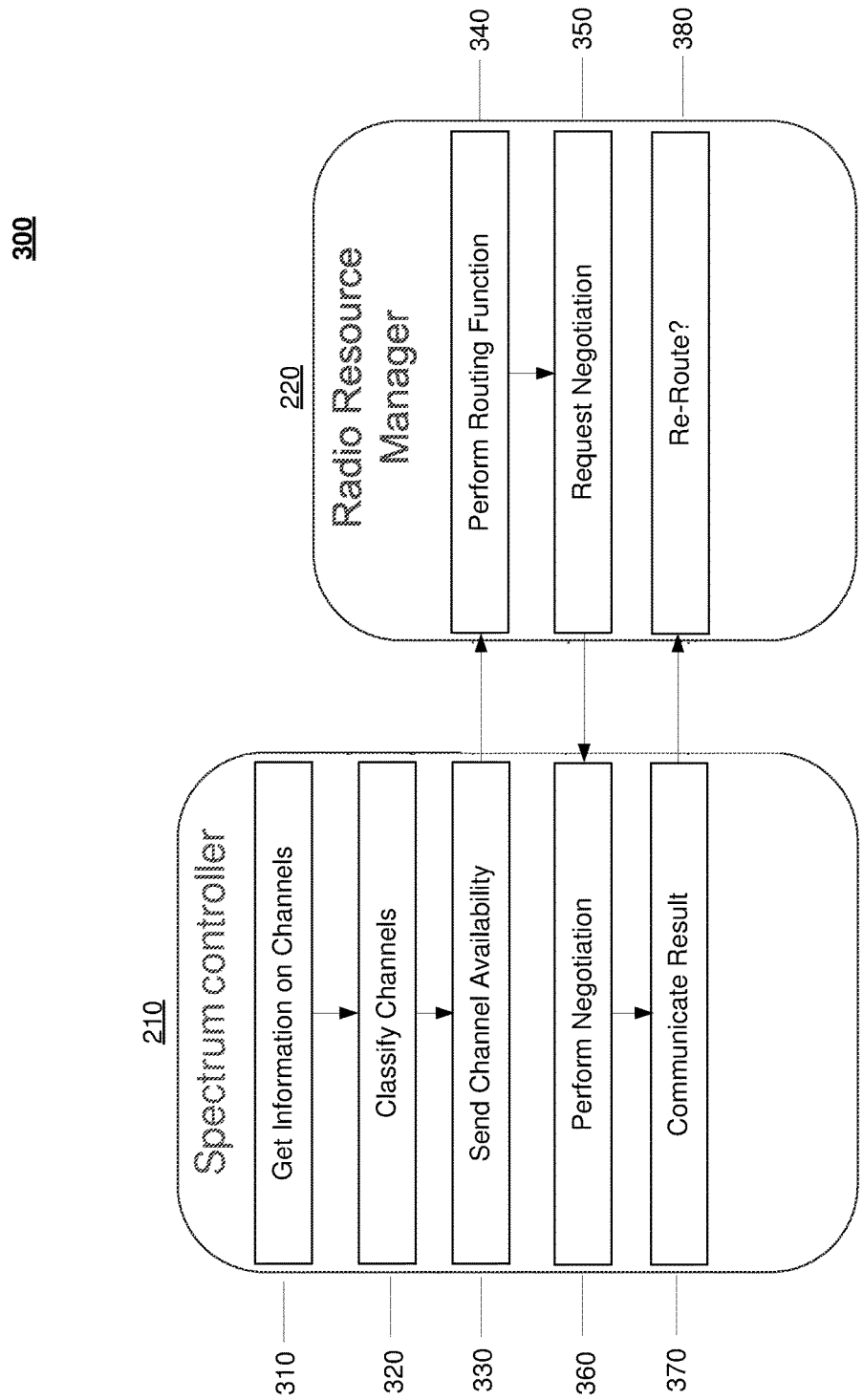
FIG. 3 is a flow chart illustrating an information routing process in accordance with exemplary embodiments.

Referring now to FIG. 3, a process 300 for improved information routing in a network, such as network 100, is provided. Process 300 includes the communication of information between a spectrum controller 210 and a radio resource manager 220. As described above with respect to FIG. 2, the spectrum controller 210 and radio resource manager 220 of process 300 may be physically embodied in numerous ways.

In step 310, the spectrum controller gets information on one or more channels of a network, such as network 100.

The information may be obtained, for instance, from a channel information source. In some embodiments, the channel information source may be a spectrum broker 240 or a geo-location database (GLDB) 280. For example, a spectrum broker 240 may be configured to make exclusive, and often time-limited, resource allocations in order to separate users. A GLDB 280 may provide information on locally available spectrum, and in some configurations, is integrated into the network. The information from the GLDB 280 may include operational constraints, such as power limitations or similar protections to protect users of different services in a secondary usage or Licensed Shared Access (LSA) scenario.

The channel information source may also be another network 260, such as a neighboring ultra-dense network (UDN). In order to coordinate radio resources, the spectrum controller 210 may exchange information not only with neighboring networks, but also an inter-UDN coordination manager. Further, the spectrum controller 210 may receive channel information from a spectrum manager (operator resources) 270 or another measurement function 250. According to some embodiments, the measurement function may be associated with the radio resource manager 220 and/or a node of the network 100 (e.g., 110,140). For example, measurement information may be received from a router, MAC layer, or PHY layer. Measurement information could include, for example, buffer status, error rate, interference rise over thermal noise, and signal to interference plus noise ratio (SINR) for one or more of the channels.

In step 320, the spectrum controller 210 classifies a number of radio channels of the network based on the information obtained in step 310. According to some embodiments, the classification may include assigning an availability tag to one or more channels, where the availability tag classifies a respective channel as available, partially available, or unavailable. As used herein, the classification of a channel as "available" means that the channel may be considered by the routing functionality and used for communicating information in the network. The classification of a channel as "partially available," means that while the channel may be used, and possibly considered by the radio resource manager in determining a routing solution, it is likely subject to one or more constraints. For example, a node may be operating on a partially available channel on a secondary basis, and therefore, may need to protect a primary user (i.e., it may need to leave the channel if the primary user preempts). In this instance, the spectrum controller may obtain and share with the radio resource manager additional information about the primary user, such as permissible interference criteria (e.g., interference to noise ratio, signal to noise ratio, interference thresholds, etc.). As another non-limiting example, a partially available channel may be used by another network/cluster/system, but if necessary, the spectrum controller 210 may negotiate for (partial) access to the channel. Thus, in some respects, the term "partially available" may be understood as "potentially available." That is, that based on a subsequent negotiation, a partially available channel may become available. The availability classification "partially available" may also indicate that the channel is subject to unknown or varying conditions, such as noise from unknown radio systems, or that the channel bandwidth is only partially available.

The classification of a channel as "unavailable" means that the channel cannot be used. Thus, in some embodiments, a channel that is tagged unavailable should not be considered by the routing resource manager in determining a routing solution. In certain aspects, the spectrum controller may be unable to negotiate for access to channels that are unavailable. The assigning of an availability tag may include, for example, the use of a numerical identifier, a textual identifier, the location of a channel indicator in a communication, and/or any other method sufficient to indicate the availability of a channel.

In step 330, the channel availability is sent to the radio resource manager 220. This information may be sent, for example, via a channel list that indicates the availability of one or more channels. As such, the spectrum controller 210 is configured to process the obtained information, classify the channels, and provide the radio resource manager 220 with simplified information for use in routing, thereby reducing the computational burden on the radio resource manager 220 and decreasing the time required to construct a routing solution. Accordingly, in some embodiments, the spectrum controller 210 may sometimes only inform the radio resource manager 220 of channels that are either available or partially available, omitting channels that are unavailable. Limiting the number of channels sent to the radio resource manager 220 can reduce the number of channels considered in an optimization process of radio resource manager 220.

In step 340, the radio resource manager 220 uses the channel availability information received from the spectrum controller 210 to perform a routing function, such as selecting a routing solution for communicating information in the network. This can include, for example, determining a number of candidate routes and selecting a route that satisfies one or more routing criteria, such as minimum hop, a throughput metric, or a delivery probability metric. In some embodiments, the radio resource manager 220 may perform routing based only on channels that have been classified as available, or in the alternative, using a combination of available and partially available channels. According to some embodiments, as part of the performance of a routing procedure, the radio resource manager 220 may identify one or more channels that would be required to utilize an optimum routing solution. In some embodiments, the radio resource manager may identify one or more channels that are required for proper network operation.

If the best channel has the tag "available", the routing functionality may simply create a routing solution. The route can be composed of links connecting neighboring wireless nodes and the routing solution may comprise a set of spectrum resources, and optionally, a period relative to a routing assignment duration (often referred to as a frame duration), during which the resources can be used by a single link. After a routing solution is selected, the routing functionality may inform the lower layers about the routing solution to allow continuous operation. This step may include, for example, starting channel transmission.

If the radio resource manager 220 determines a routing solution, or candidate routing solution, that requires a partially available channel, then at step 350 the radio resource manager 220 may send a request to the spectrum controller 210 to negotiate access to the partially available channel. Meanwhile the routing functionality may create a routing solution with the best "available" channel. In some embodiments, the radio resource manager 220 may submit alternative acceptable channels for negotiation. In this case, the spectrum controller 210 may successfully negotiate for access to one alternative channel, while the remaining alternative channels are released.

In step 360, the spectrum controller 210 may perform an access negotiation with respect to the identified partially available channel. For example, spectrum controller 210 may request channel access from an external spectrum broker 240 or geo-location database 280. In some embodiments, the spectrum controller 210 may negotiate with a second network 260 or inter-network coordination manager as part of a radio resource coordination effort. In some embodiments, the negotiation may be with a spectrum manager 270 within the operator's network. As a result of the negotiation, the spectrum controller 210 may determine whether the identified channel is now available.

In step 370, the result of the negotiation is communicated to the radio resource manager 220. Based at least in part on this result, in step 380, the radio resource manager 220 may determine whether it is necessary to re-route information, for example, by selecting a new routing solution, modifying the existing routing solution, or determining that access to additional channels is still required.

As described with respect to FIG. 3, a routing function may perform an optimization to find the best channel (or set of channels) and routing solution, using only the channels tagged as available or partially available. Successive routing assignment periods may be implemented continuously in order to fully optimize the routing decision as measurements or additional information, such as changes in channel status, become available to the radio resource manager 220.

Figure 4:
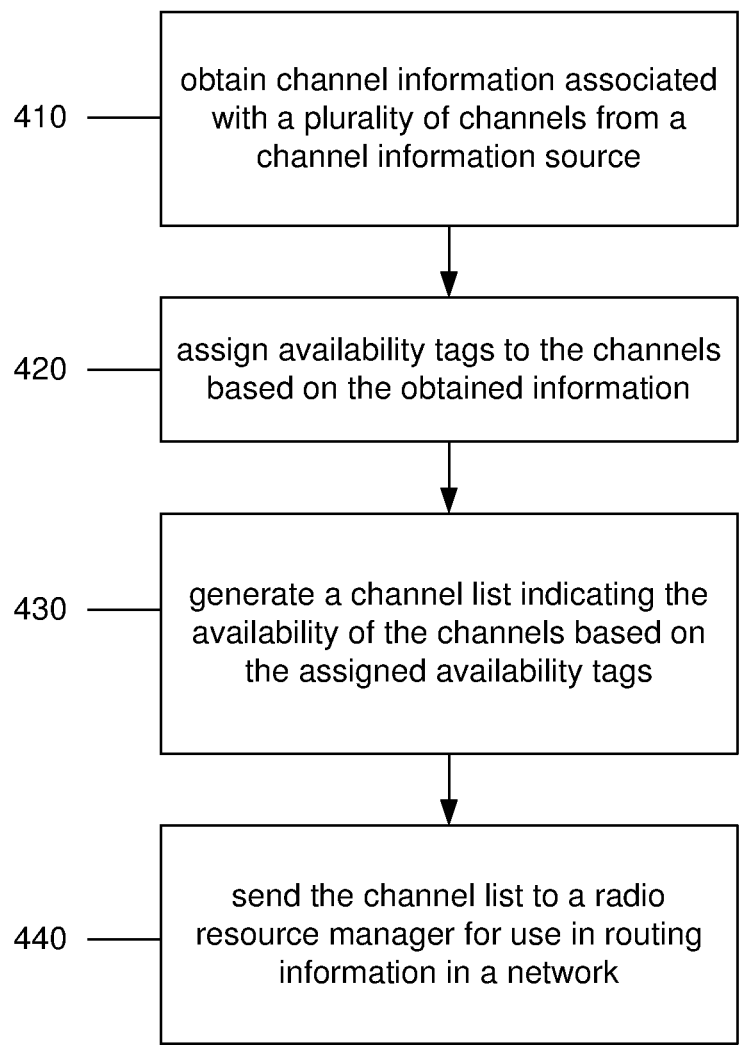
FIG. 4 is a flow chart illustrating an information routing process in accordance with exemplary embodiments.

Referring now to FIG. 4, a process 400 is provided for routing information in a network 100 having a plurality of radio channels, a spectrum controller 210, and a radio resource manager 220.

In step 410, the spectrum controller 210 obtains channel information associated with the plurality of radio channels from a channel information source. The channel information source may be, for example, a spectrum broker 240, a geo-location database 280, a second network 260, an inter-UDN coordination manager, an operator spectrum manager 270, or the measurement functionality 250 of a network node (e.g., 110,140) or the radio resource manager 220. In some embodiments, this information includes one or more of buffer status, error rate, interference rise over thermal noise, and signal to interference plus noise ratio (SINR) for at least one of the channels.

In step 420, the spectrum controller 210 assigns availability tags to the channels based on the obtained information. In some embodiments, the tags include "available," "partially available," and "unavailable."

In step 430, the spectrum controller 210 generates a channel list that indicates the availability of each channel. The channel list is based on the tags that have been assigned to each channel. According to some embodiments, the spectrum controller may remove or otherwise omit certain channels from the list, such as channels that have been assigned the tag "unavailable." In some embodiments, the channel information communicated to the radio resource manager 220 may be limited to only availability information, thereby reducing transmit times and resource use, while limiting the amount of information that needs to be processed.

In step 440, the channel list is sent to the radio resource manager 220, where it may be used for routing information in the network 100. In some embodiments, routing is performed under the constraint that each considered node (e.g., 110,120, 130) can transmit and receive on only one channel at a time. For instance, it might be assumed that channel switching takes too long time to perform while forwarding packets along a given route. Thus, in some embodiments, a routing problem can be assessed by representing each node by a set of virtual nodes, one for each channel, and performing routing between virtual nodes under the assumption that virtual nodes belonging to different channels cannot communicate with each other. In some cases, the solution of this routing problem will, in principle, result in an optimal split of nodes into clusters using a common channel (often with at least one aggregation node in each cluster).

Figure 5:
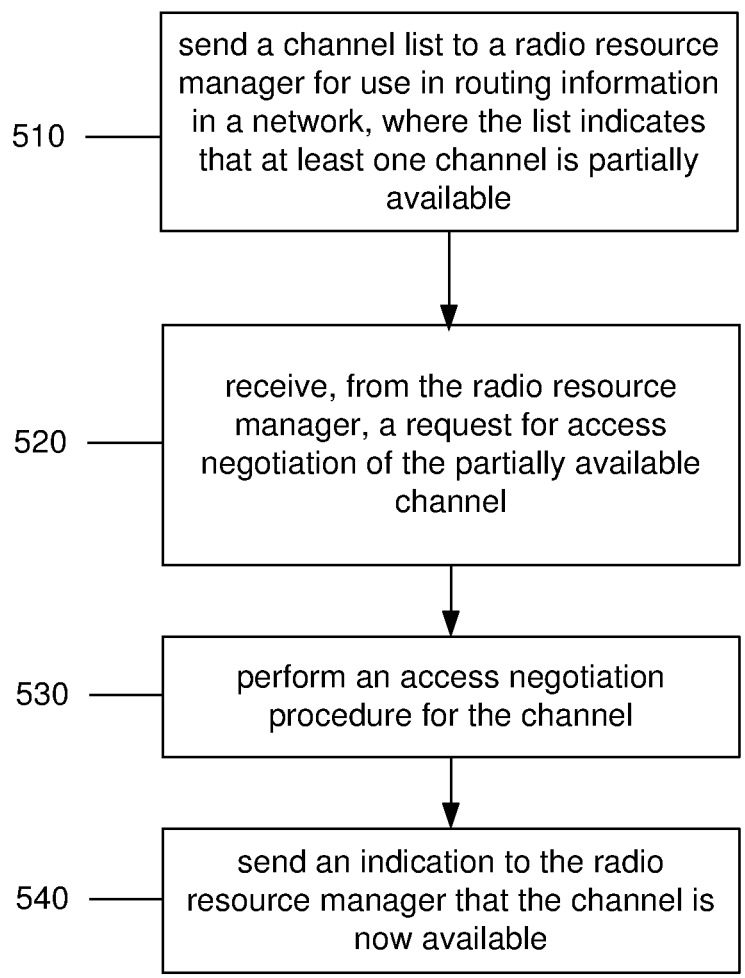
FIG. 5 is a flow chart illustrating an information routing process in accordance with exemplary embodiments.

Referring now to FIG. 5, a process 500 is provided for improved routing selection in a network. The network may be, for example, network 100 having a plurality of radio channels, a spectrum controller 210, and a radio resource manager 220.

In step 510, the spectrum controller 210 sends a channel list to the radio resource manager 220. The channel list indicates the availability of a number of channels in the network 100. In this embodiment, at least one of the channels will be deemed "partially available" by the spectrum controller 210. The radio resource manager 220 may use the availability information provided in the channel list to determine one or more routing solutions for information transmission in the network 100.

In step 520, the spectrum controller 210 receives a request for access negotiation from the radio resource manager 220 for the partially available channel. This may be, for instance, because the radio resource manager 220 determined that an optimum routing solution required the partially available channel or because the partially available channel was necessary for network operation.

In step 530, the spectrum controller 210 performs an access negotiation procedure for the channel. This procedure may include, for example, requesting channel access from an external spectrum broker 240 or geo-location database 280, which may be internal or external to the network. In some embodiments, the spectrum controller 210 may negotiate with a second network 260 or inter-network coordination manager as part of a radio resource coordination effort. For instance, the desired channel may be shared among networks, or use of the channel may interfere with the operation of second network 260. In some embodiments, the negotiation may be with a spectrum manager 270 within the operator's network. In some embodiments, the radio resource manager 220 may use a temporary routing solution, for instance, using only channels that have been tagged "available," until the spectrum controller completes its negotiation for the desired partially available channel.

In step 540, the spectrum controller 210 sends an indication to the radio resource manager 220 regarding the availability of the channel. For instance, the spectrum controller 210 may inform the radio resource manager 220 that the previously partially available channel is now available for use. In some embodiments, the use of the channel may be partially constrained based on the outcome of the negotiation procedure. For instance, the access grant may be limited in time.

Figure 6:
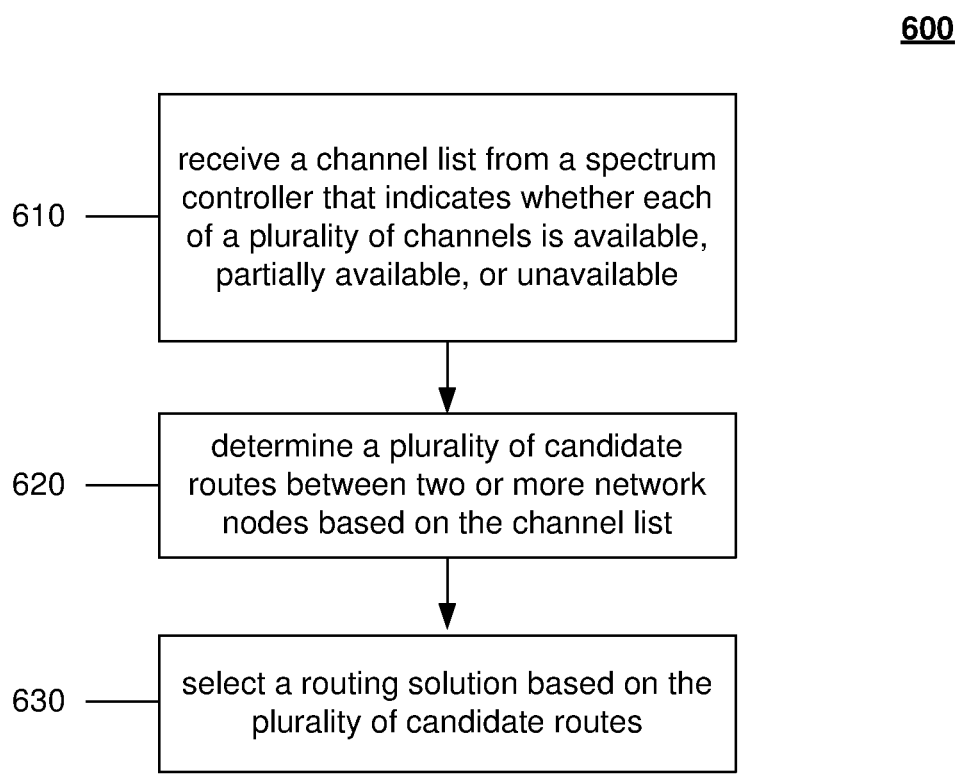
FIG. 6 is a flow chart illustrating an information routing process in accordance with exemplary embodiments.

Referring now to FIG. 6, a process 600 is provided for routing information in a network, such as network 100, which as a plurality of radio network nodes and a plurality of radio channels. In some embodiments, the process 600 is performed by a radio resource manager 220, which may be a function-specific device, integrated into another device, such as a network node (e.g. 110,140), or distributed across one or more device and/or network nodes.

In step 610, the radio resource manager 220 receives a channel list from a spectrum controller 210. The list may indicate whether one or more of the plurality of radio channels is available, partially available, or unavailable. In some embodiments, the list may only contain channels that are available, or only channels that are either available or partially available, omitting unavailable channels. The list may present reduced and/or simplified information, thereby reducing processing burdens on the radio resource manager 220. In some embodiments, the spectrum controller 210 and radio resource manager 220 may be separate logical units of a single device.

In step 620, the radio resource manager 220 may determine a plurality of candidate routes between two or more of the network nodes based on the channel list. The determination of candidate routes and selection of a routing solution may be performed using numerous metrics and routing algorithms. The metric may provide, for instance, a quantitative measure of the quality or a route or path in the network 100. The best path may be one that yields the smallest (or largest) routing metric. In some embodiments, a routing function of the radio resource manager 220 compares the performance results for all allocations and finds the most efficient one. Exemplary routing metrics may include a hop-count metric, which is based on the total number of links in a given path; a throughput metric, which is based on minimization of bottleneck of link bit rates along a given path; or the probability of correctly delivering a packet over a given path. Such a probability could be determined, for instance, based on the product of the probabilities of delivering the packet over each individual link. Using these metrics, links may be attributed a weight, and the routing function may evaluate routes by assessing the total weights of different route permutations.

In step 630, the radio resource manager 220 selects a routing solution based on the candidate routes. In some embodiments, the radio resource manager 220 may authorize or otherwise initiate information transmission on the nodes and channels of the selected route.

Figure 7:
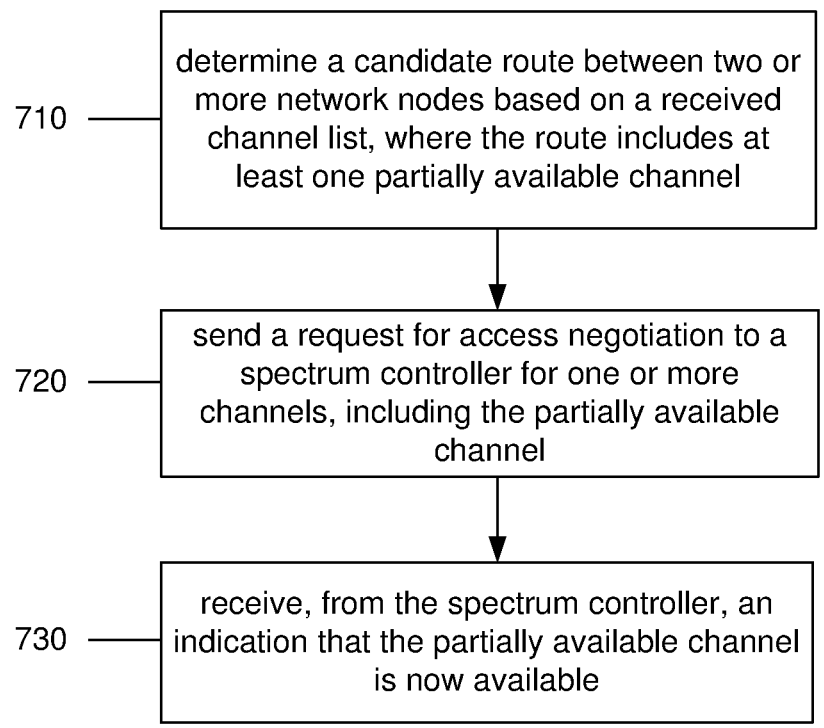
FIG. 7 is a flow chart illustrating an information routing process in accordance with exemplary embodiments.

Referring now to FIG. 7, a process 700 is provided for improved routing in a network, such as network 100, which has a plurality of radio network nodes and a plurality of radio channels.

In step 710, a radio resource manager 220 determines a candidate route between two or more nodes of the network based on a received channel list that indicates the availability of channels in the network. In this embodiment, the candidate route includes at least one channel that has been deemed "partially available" by a spectrum controller 210. The candidate route may be, for instance, a route that optimizes network operation in network 100.

For example, the routing functionality of radio resource manager 220 may find a set of all channels ("ideal channels") that when used in a corresponding routing solution, would produce the best performance according to a given metric. It may do so, for instance, by evaluating a number of routing permutations against the metric and comparing the results of each permutation. The radio resource manager 220 may then extract from the ideal channel set the channels that have been tagged as "partially available." This set of "partially available" channels could be, in some instance, an empty set. However, if it is a non-empty set, the radio resource manager 220 may request access to the partially available channels of the set. In some instances, the desired partially available channel(s) may be necessary for the network to operate.

In step 720, the radio resource manager 220 sends the spectrum controller 210 a request for access negotiation for at least one partially available channel of the candidate route. In some embodiments, the radio resource manager 220 sends multiple alternative channels for the spectrum manager to negotiate access. For instance, the radio resource manager 220 may identify first and second alternative channels for the spectrum controller, where either channel would be acceptable. In this example, the spectrum controller 210 might attempt to negotiate access for both alternative channels, successfully gain access to one of the channels, and release the other. In some embodiments, the radio resource manager 220 may also send additional information to the spectrum controller 210, including network topology information and channel information. Channel information sent from the radio resource manager 220 could include, for example, buffer status, error rate, interference rise over thermal noise, and signal to interference plus noise ratio (SINR) for one or more of the channels. This information could be obtained, for instance, from a router, MAC layer, or PHY layer of the network.

In step 730, the radio resource manager 220 receives from the spectrum controller 210 an indication as to whether the one or more of the previously partially available channels is now available for use. If a channel is now available, it may, for example, be considered in a subsequent route selection procedure. In some embodiments, the radio resource manager may elect to modify an existing routing solution using the newly available channel. The indication of availability may be received in a number of ways, including but not limited to, the receipt of a new channel list or a channel-specific message from the spectrum controller 210.

Figure 8:
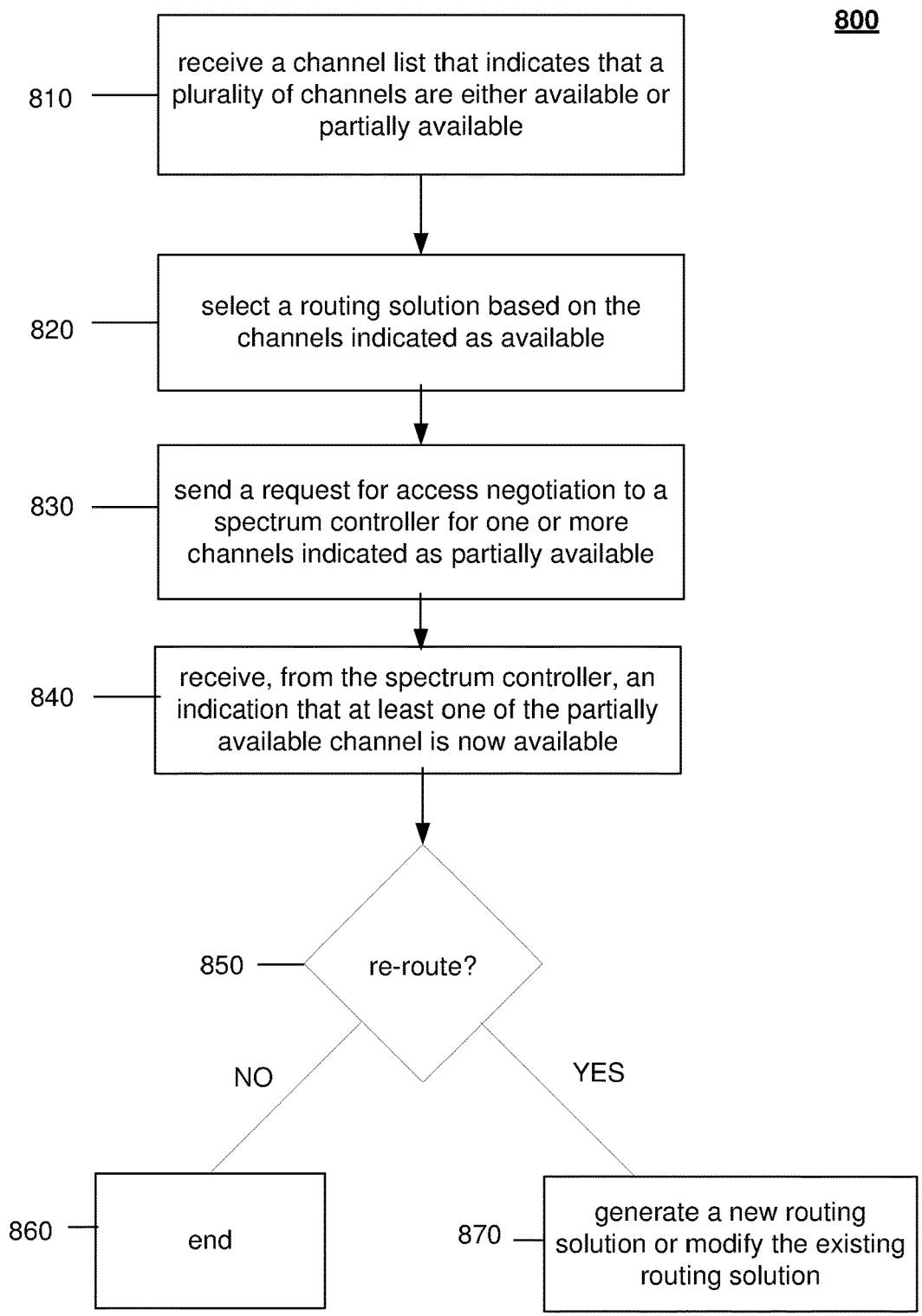
FIG. 8 is a flow chart illustrating an information routing process in accordance with exemplary embodiments.

In some embodiments, it may be desirable or necessary to generate a routing solution before negotiating for access to more optimal channels. For example, a radio resource manager 220 may derive a temporary routing solution based on only channels that have been tagged "available" for use until a spectrum controller 210 completes a negotiation for a desired, and possibly more optimal, partially available channel. In FIG. 8, a process 800 is provided for routing information in a network, such as network 100, that implements a first routing solution based on available channels before a spectrum controller has completed access negotiation for a partially available channel.

In step 810, the radio resource manager 220 receives a channel list that indicates that each of a plurality of channels is either available or partially available. The list may be received from, for example, the spectrum controller 210.

In step 820, the radio resource manager 220 selects a routing solution based on the channels indicated as available. At this time, the radio resource manager 220 may authorize or otherwise initiate information transmission on one or more network nodes and channels according to the routing solution. For instance, the radio resource manager 220 may pass routing information to lower layers for immediate utilization in the system operation. The radio resource manager 220 may also make a set of exploratory resource allocations, one for each of a number of permutations of either using or not using the channels tagged as "partially available." If there are many channels that are tagged as "partially available" in a preferred permutation, the radio resource manager 220 may request access to those channels.

In this example, at step 830, the radio resource manager 220 sends a request for access negotiation to the spectrum controller 210 for one or more of the channels indicated as partially available. In some embodiments, the radio resource manager 220 sends multiple alternative channels for the spectrum manager to negotiate access. For instance, the radio resource manager 220 may identify first and second alternative channels for the spectrum controller, where either channel would be acceptable. One or more of the channels sent to the spectrum controller 210 may be required to optimize performance in the network 100. One or more of the channels sent to the spectrum controller 210 may be required for the network 100 to operate properly.

In step 840, the radio resource manager 220 receives, from the spectrum controller 210, an indication that at least one of the partially available channels is now available for use in routing. At step 850, and based on the received indications from spectrum controller 210, the radio resource manager 220 decides whether it is necessary to re-route information in the network 100. If not, in step 860, the process 800 ends. The radio resource manager 220, however, may repeat process 800, perform one or more of processes 600 and 700, or otherwise determine if access to additional channels is still required.

If re-routing is necessary, in step 870 the radio resource manager 220 will re-route information in the network 100. For example, the radio resource manager 220 may generate a new routing solution or modify the existing routing solution.

Figure 9:
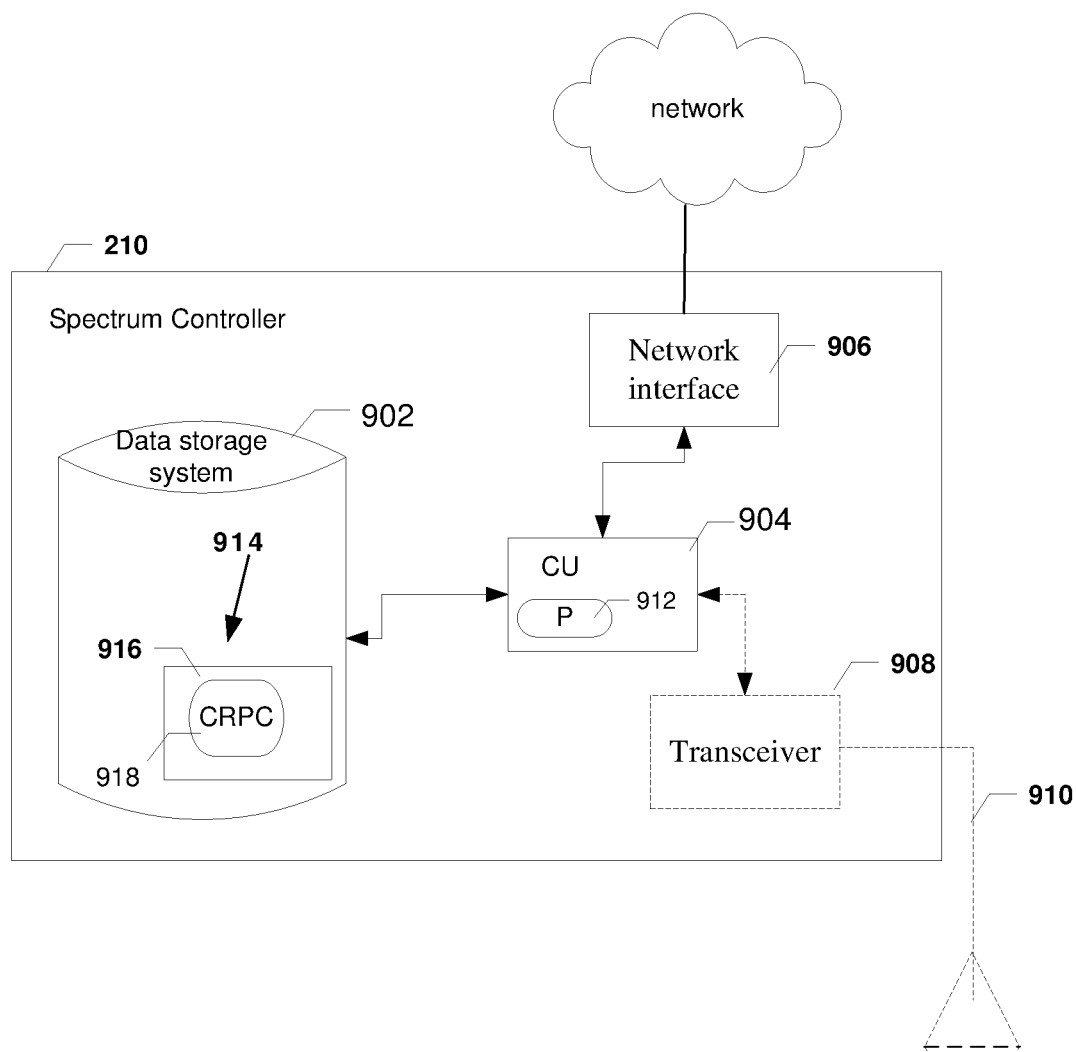
FIG. 9 is a block diagram of a spectrum controller in accordance with exemplary embodiments.

FIG. 9 illustrates a block diagram of an example spectrum controller 210. In the embodiment shown in FIG. 9, spectrum controller 210 includes: control unit (CU) 904 (e.g., a data processing system), which may include one or more processors (P) 912 (e.g., microprocessors) and/or one or more circuits, such as an application specific integrated circuit (ASIC), Field-programmable gate arrays (FPGAs), etc.; a network interface 906 for connecting the spectrum controller 210 to network 100, radio resource manager 220, aggregate node 140, and/or external entities, such as spectrum broker 240 or other networks 260; a transceiver 908 coupled to an antenna 910 for wireless communicating with, for example, one or more network nodes (e.g. 110); a data storage system 902, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where control unit 904 includes a processor 912 (e.g., a microprocessor), a computer program product 914 may be provided, which computer program product includes: computer readable program code 918 (e.g., instructions), which implements a computer program, stored on a computer readable medium 916 of data storage system 902, such as, but not limited, to magnetic media (e.g., a hard disk), optical media (e.g., a DVD), memory devices (e.g., random access memory), etc. In some embodiments, computer readable program code 918 is configured such that, when executed by control unit 904, code 918 causes the control unit 904 to perform steps described herein (e.g., steps shown in FIGS. 3, 4, and/or 5).

In some embodiments, spectrum controller 210 is configured to perform steps described above without the need for code 918. For example, control unit 904 may consist merely of specialized hardware, such as one or more application-specific integrated circuits (ASICs). Hence, the features of the present invention described above may be implemented in hardware and/or software. For example, in some embodiments, the functional components of spectrum controller 210 described above may be implemented by control unit 904 executing program code 918, by control unit 904 operating independent of any computer program code 918, or by any suitable combination of hardware and/or software.

Figure 10:
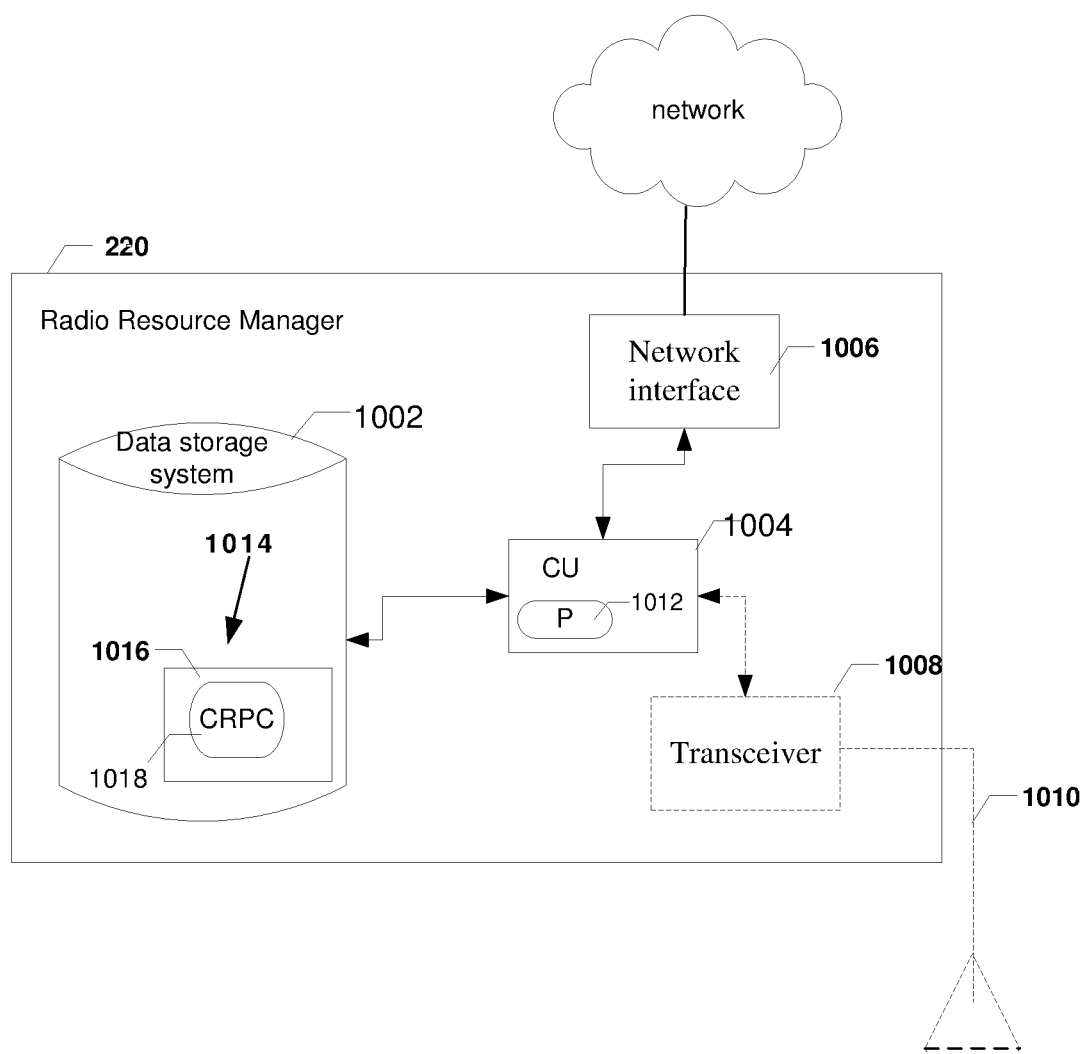
FIG. 10 is a block diagram of a radio resource manager in accordance with exemplary embodiments.

FIG. 10 illustrates a block diagram of an example radio resource manager 220. In the embodiment shown in FIG. 10, radio resource manager 220 includes: control unit (CU) 1004 (e.g., a data processing system), which may include one or more processors (P) 1012 (e.g., microprocessors) and/or one or more circuits, such as an application specific integrated circuit (ASIC), Field-programmable gate arrays (FPGAs), etc.; a network interface 1006 for connecting the radio resource manager 220 to network 100, spectrum controller 210, and/or aggregate node 140; a transceiver 1008 coupled to an antenna 1010 for wireless communicating with, for example, one or more network nodes (e.g. 110); a data storage system 1002, which may include one or more computer-readable data storage mediums, such as non-transitory memory unit (e.g., hard drive, flash memory, optical disk, etc.) and/or volatile storage apparatuses (e.g., dynamic random access memory (DRAM)). In some embodiments, the radio resource manager 220 may include measurement functionality 250.

In embodiments where control unit 1004 includes a processor 1012 (e.g., a microprocessor), a computer program product 1014 may be provided, which computer program product includes: computer readable program code 1018 (e.g., instructions), which implements a computer program, stored on a computer readable medium 1016 of data storage system 1002, such as, but not limited, to magnetic media (e.g., a hard disk), optical media (e.g., a DVD), memory devices (e.g., random access memory), etc. In some embodiments, computer readable program code 1018 is configured such that, when executed by control unit 1004, code 1018 causes the control unit 1004 to perform steps described herein (e.g., steps shown in FIGS. 3, 6, 7, and/or 8).

In some embodiments, radio resource manager 220 is configured to perform steps described above without the need for code 1018. For example, control unit 1004 may consist merely of specialized hardware, such as one or more application-specific integrated circuits (ASICs). Hence, the features of the present invention described above may be implemented in hardware and/or software. For example, in some embodiments, the functional components of radio resource manager 220 described above may be implemented by control unit 1004 executing program code 1018, by control unit 1004 operating independent of any computer program code 1018, or by any suitable combination of hardware and/or software.

Figure 11:
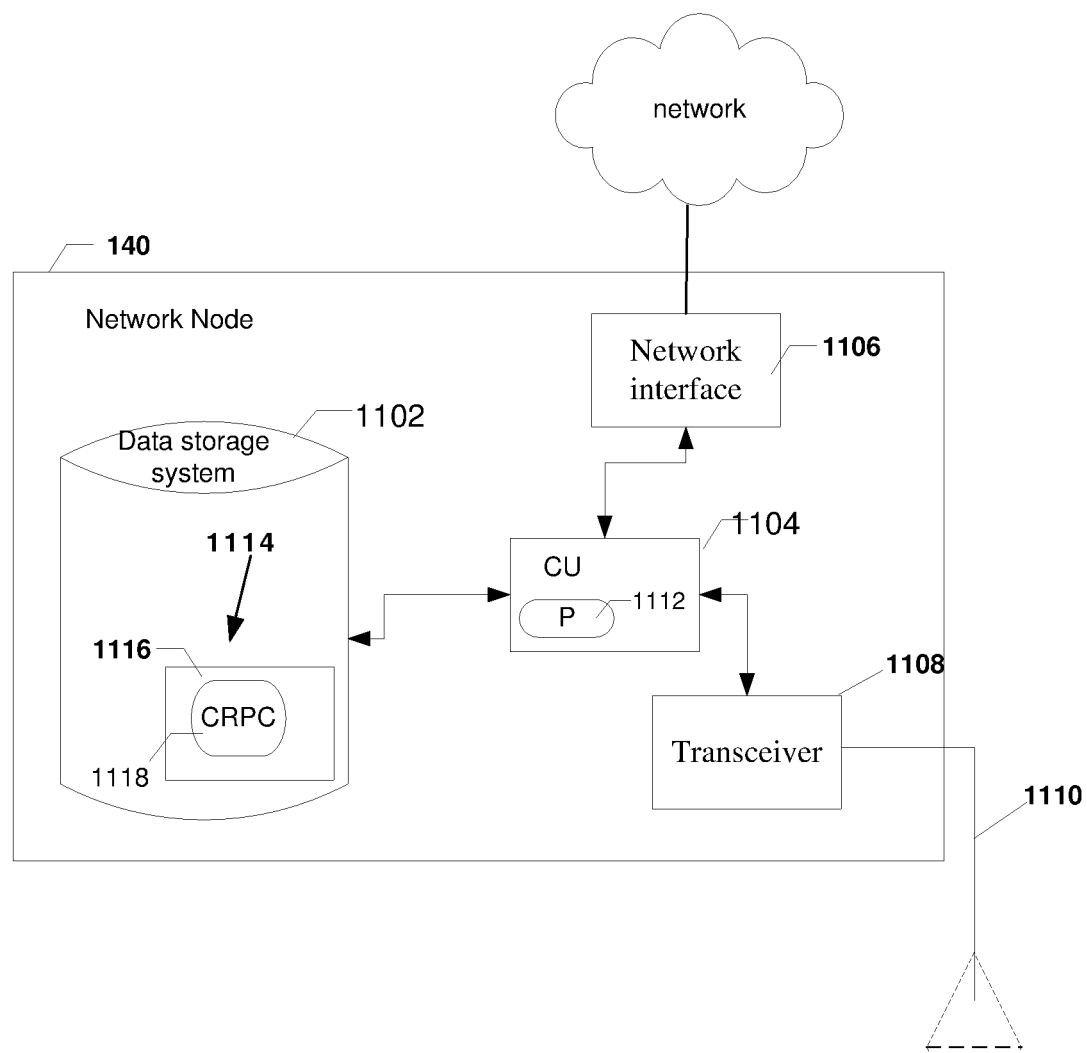
FIG. 11 is a block diagram of a network node in accordance with exemplary embodiments.

FIG. 11 illustrates a block diagram of an example network node 140. As described herein, the functionality of the spectrum controller 210 and radio resource manager 220 may be implemented as specific devices, or included as modules in other devices such as a network node. As such, a network node 140 may serve as a spectrum controller 210 or radio resource manager 220.

In the embodiment shown in FIG. 11, network node 140 includes: control unit (CU) 1104 (e.g., a data processing system), which may include one or more processors (P) 1112 (e.g., microprocessors) and/or one or more circuits, such as an application specific integrated circuit (ASIC), Field-programmable gate arrays (FPGAs), etc.; a network interface 1106 for connecting the network node 140 to network 100, radio resource manager 220, network node 110, and/or external entities or other networks; a transceiver 1108 coupled to an antenna 1110 for wireless communicating with, for example, one or more other network nodes (e.g. 120,130,140); a data storage system 1102, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where control unit 1104 includes a processor 1112 (e.g., a microprocessor), a computer program product 1114 may be provided, which computer program product includes: computer readable program code 1118 (e.g., instructions), which implements a computer program, stored on a computer readable medium 1116 of data storage system 1102, such as, but not limited, to magnetic media (e.g., a hard disk), optical media (e.g., a DVD), memory devices (e.g., random access memory), etc. In some embodiments, computer readable program code 1118 is configured such that, when executed by control unit 1104, code 1118 causes the control unit 1104 to perform steps described herein (e.g., steps shown in FIGS. 3-8). As described above, the functionality of both the spectrum controller 210 and radio resource manager 220 could be implemented in a single device, where their respective functions form separate logical units.

In some embodiments, network node 140 is configured to perform steps described above without the need for code 1118. For example, control unit 1104 may consist merely of specialized hardware, such as one or more application-specific integrated circuits (ASICs). Hence, the features of the present invention described above may be implemented in hardware and/or software. For example, in some embodiments, the functional components of network node 110 described above may be implemented by control unit 1104 executing program code 1118, by control unit 1104 operating independent of any computer program code 1118, or by any suitable combination of hardware and/or software.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for routing information in a network having a plurality of radio network nodes, a plurality of radio channels, a spectrum controller, and a radio resource manager, the method comprising:
   obtaining, at said spectrum controller from a channel information source, channel information associated with one or more of said plurality of channels;
   assigning, at said spectrum controller, an availability tag to each of two or more of said plurality of channels based on said obtained channel information, wherein each assigned availability tag is selected from availability tags indicating whether a tagged channel is available, partially available, or unavailable, and wherein at least one of said assigned availability tags classifies a respective channel as partially available;
   generating, at said spectrum controller, a channel list indicating the availability of one or more of said plurality of channels based on said assigned availability tags; and
   sending said channel list from said spectrum controller to said radio resource manager for use in routing information in said network.

2. The method of claim 1, further comprising:
   receiving, at said spectrum controller from said radio resource manager, a request for negotiation of an identified channel, wherein said identified channel is classified as partially available.

3. The method of claim 2, further comprising:
   performing, at said spectrum controller, an access negotiation procedure for said identified channel based on said request for channel negotiation; and
   sending, from said spectrum controller to said radio resource manager, an indication that said identified channel is available.

4. The method of claim 1, further comprising:
   receiving, at said spectrum controller from said radio resource manager, an indication of a set of channels to optimize network operation within said network or required for operation of said network.

5. The method of claim 4, further comprising:
   performing, at said spectrum controller, an access negotiation procedure based on the indication of said set of channels received from said radio resource manager to optimize network operation within said network or required for the operation of said network.

6. The method of claim 1, wherein said availability tag is a numerical identifier.

7. The method of claim 1, further comprising:
   receiving, at said spectrum controller from said radio resource manager, a request for negotiation of a first alternative channel or a second alternative channel; and
   performing, at said spectrum controller, an access negotiation procedure based on said first and second alternative channels,
   wherein the first alternative channel is selected for use and said second alternative channel is released based on said access negotiation procedure.

8. The method of claim 1, wherein said obtained channel information includes one or more of buffer status, error rate, interference rise over thermal noise, and signal to interference plus noise ratio for at least one of said plurality of channels.

9. The method of claim 1, further comprising:
   sending, from said spectrum to controller to said channel information source, a request for channel information.

10. The method of claim 1, wherein said channel information source is a spectrum broker, a geo-location database, a second network, an inter-UDN coordination manager, an operator spectrum manager, or measurement function associated with said radio resource manager.

11. A method for routing information in a network having a plurality of radio network nodes and a plurality of radio channels, the method comprising:
    receiving, at a radio resource manager from a spectrum controller, a channel list, wherein said channel list indicates whether each of said plurality of channels is available, partially available, or unavailable, said channel list indicating that at least one of said plurality of channels is partially available;
    determining, at said radio resource manager, a plurality of candidate routes between two or more of said network nodes based on said channel list, wherein said plurality of candidate routes is limited to channels from the channel list that are indicated as available and/or partially available; and
    selecting, at said radio resource manager, a routing solution based on said plurality of candidate routes.

12. The method of claim 11, further comprising:
    sending, from said radio resource manager to said spectrum controller, a request for access negotiation if said routing solution is based at least in part on a channel indicated as partially available.

13. The method of claim 11, further comprising:
sending, from said radio resource manager to said spectrum controller, an identification of one or more of said channels required to utilize an optimum routing solution.

14. The method of claim 11, further comprising:
sending, from said radio resource manager to said spectrum controller, an identification of one or more of said channels required for network operation.

15. The method of claim 11, further comprising:
sending, from said radio resource manager to said spectrum controller, topology information related to said network.

16. The method of claim 11, wherein said routing solution is limited to channels that are indicated as available, and further comprising:
sending, from said radio resource manager to said spectrum controller, a request for access negotiation of an identified channel indicated as partially available.

17. The method of claim 16, further comprising:
receiving, at said radio resource manager from said spectrum controller, an indication that said identified channel is available; and
modifying, at said radio resource manager, said routing solution to include said identified channel.

18. The method of claim 11, further comprising:
determining, at said radio resource management device, a plurality of candidate routes between two or more of said network nodes based on said channel list, wherein said plurality of candidate routes is limited to channels that are indicated as partially available;
generating, at said radio resource management device, a channel list based on said plurality of candidate routes; and
sending said channel list from said radio resource manager to said spectrum controller.

19. The method of claim 18, wherein said channel list includes a first alternative channel and a second alternative channel, further comprising:
receiving, at said radio resource management device from said spectrum controller, an indication that said first alternative channel is available, wherein said second alternative channel is released.

20. A spectrum controller comprising a processor and a memory, said memory containing instructions executable by said processor whereby said spectrum controller is operative to:
obtain, from a channel information source, channel information associated with one or more of a plurality of channels of a network;
assign an availability tag to each of two or more of said plurality of channels based on said obtained channel information, wherein each assigned availability tag is selected from availability tags indicating whether a tagged channel is available, partially available, or unavailable, and wherein at least one of said assigned availability tags classifies a respective channel as partially available;
generate a channel list indicating the availability of one or more of said plurality of channels based on said assigned availability tags; and
send said channel list to a radio resource manager for use in routing information in said network.

21. The spectrum controller of claim 20, operative to:
receive from said radio resource manager, a request for negotiation of an identified channel, wherein said identified channel is classified as partially available.

22. The spectrum controller of claim 21, operative to:
perform an access negotiation procedure for said identified channel based on said request for channel negotiation; and
send to said radio resource manager, an indication that said identified channel is available.

23. The spectrum controller of claim 20, operative to:
receive from said radio resource manager an indication of a set of channels to optimize network operation within said network or required for operation of said network.

24. The spectrum controller of claim 23, operable to:
perform an access negotiation procedure based on the indication of said set of channels received from said radio resource manager to optimize network operation within said network or required for the operation of said network.

25. The spectrum controller of claim 20, wherein said availability tag is a numerical identifier.

26. The spectrum controller of claim 20, operative to:
receive from said radio resource manager a request for negotiation of a first alternative channel or a second alternative channel; and
perform an access negotiation procedure based on said first and second alternative channels,
wherein the first alternative channel is selected for use and said second alternative channel is released based on said access negotiation procedure.

27. The spectrum controller of claim 20, wherein said obtained channel information includes one or more of buffer status, error rate, interference rise over thermal noise, and signal to interference plus noise ratio for at least one of said plurality of channels.

28. The spectrum controller of claim 20, operative to:
send to said channel information source a request for channel information.

29. The spectrum controller of claim 20, wherein said channel information source is a spectrum broker, a geolocation database, a second network, an inter-UDN coordination manager, an operator spectrum manager, or measurement function associated with said radio resource manager.

30. A radio resource manager comprising a processor and a memory, said memory containing instructions executable by said processor whereby said radio resource manager is operative to:
receive, from a spectrum controller, a channel list, wherein said channel list indicates whether each of said plurality of channels is available, partially available, or unavailable, said channel list indicating that at least one of said plurality of channels is partially available;
determine a plurality of candidate routes between two or more radio nodes of a network based on said channel list, wherein said plurality of candidate routes is limited to channels from the channel list that are indicated as available and/or partially available; and
select a routing solution based on said plurality of candidate routes.

31. The radio resource manager of claim 30, operative to:
send to said spectrum controller a request for access negotiation if said routing solution is based at least in part on a channel indicated as partially available.

32. The radio resource manager of claim 30, operable to:
send to said spectrum controller, an identification of one or more of said channels required to utilize an optimum routing solution.

33. The radio resource manager of claim 30, operable to:
send to said spectrum controller an identification of one or more of said channels required for network operation.

34. The radio resource manager of claim 30, operable to:
send to said spectrum controller topology information related to said network.

35. The radio resource manager of claim 30, wherein said routing solution is limited to channels that are indicated as available, and operable to:
send to said spectrum controller, a request for access negotiation of an identified channel indicated as partially available.

36. The radio resource manager of claim 35, operable to:
receive from said spectrum controller, an indication that said identified channel is available; and
modify said routing solution to include said identified channel.

37. The radio resource manager of claim 30, operable to:
determine a plurality of candidate routes between two or more of said network nodes based on said channel list, wherein said plurality of candidate routes is limited to channels that are indicated as partially available;
generate a channel list based on said plurality of candidate routes; and
send said channel list from said radio resource manager to said spectrum controller.

38. The radio resource manager of claim 37, wherein said channel list includes a first alternative channel and a second alternative channel and the radio resource manager is operable to:
receive from said spectrum controller an indication that said first alternative channel is available, wherein said second alternative channel is released.

* * * * *